Nov. 26, 1963  C. VAN DER LELY  3,111,801
IMPLEMENTS FOR LATERALLY DISPLACING CROP LYING ON THE GROUND
Filed Aug. 29, 1961  3 Sheets-Sheet 3
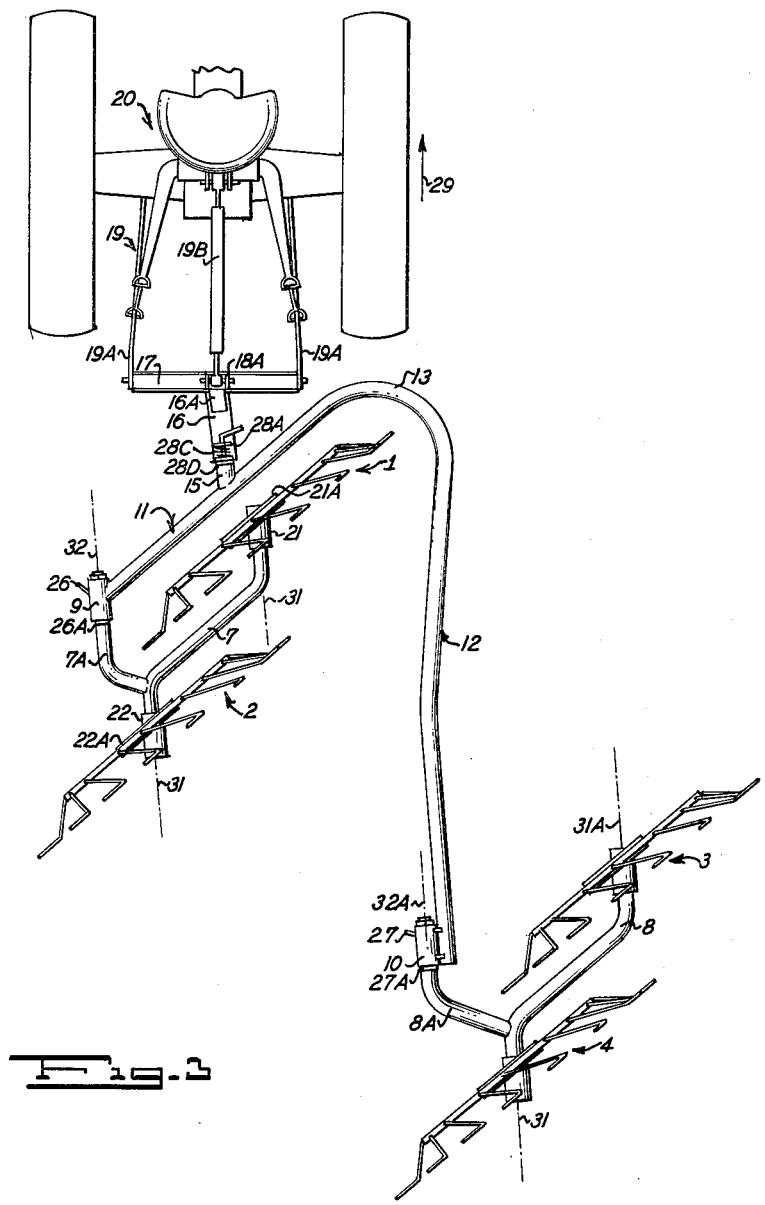
INVENTOR
CORNELIS VAN DER LELY
BY Mason, Mason & Albright
ATTORNEYS

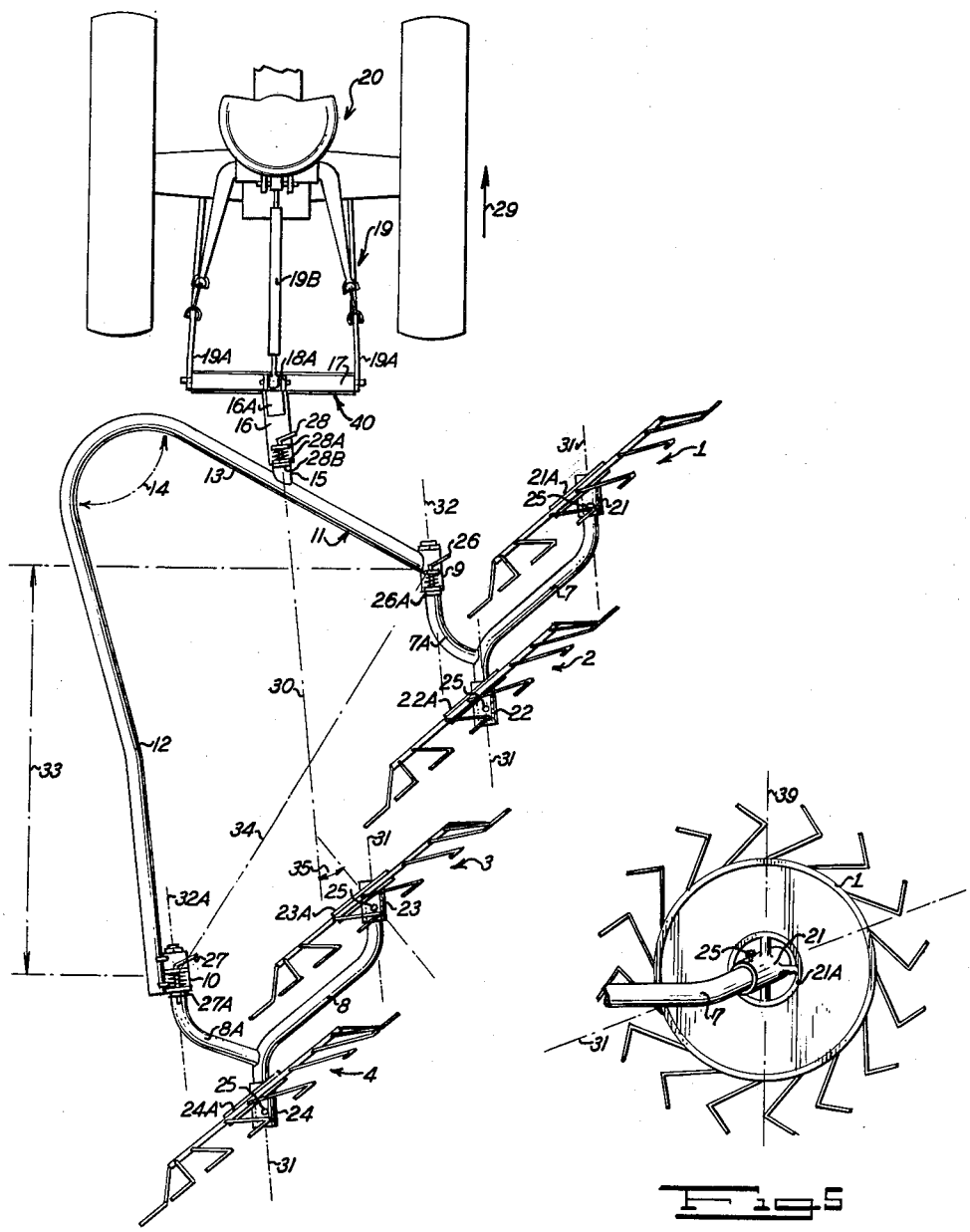

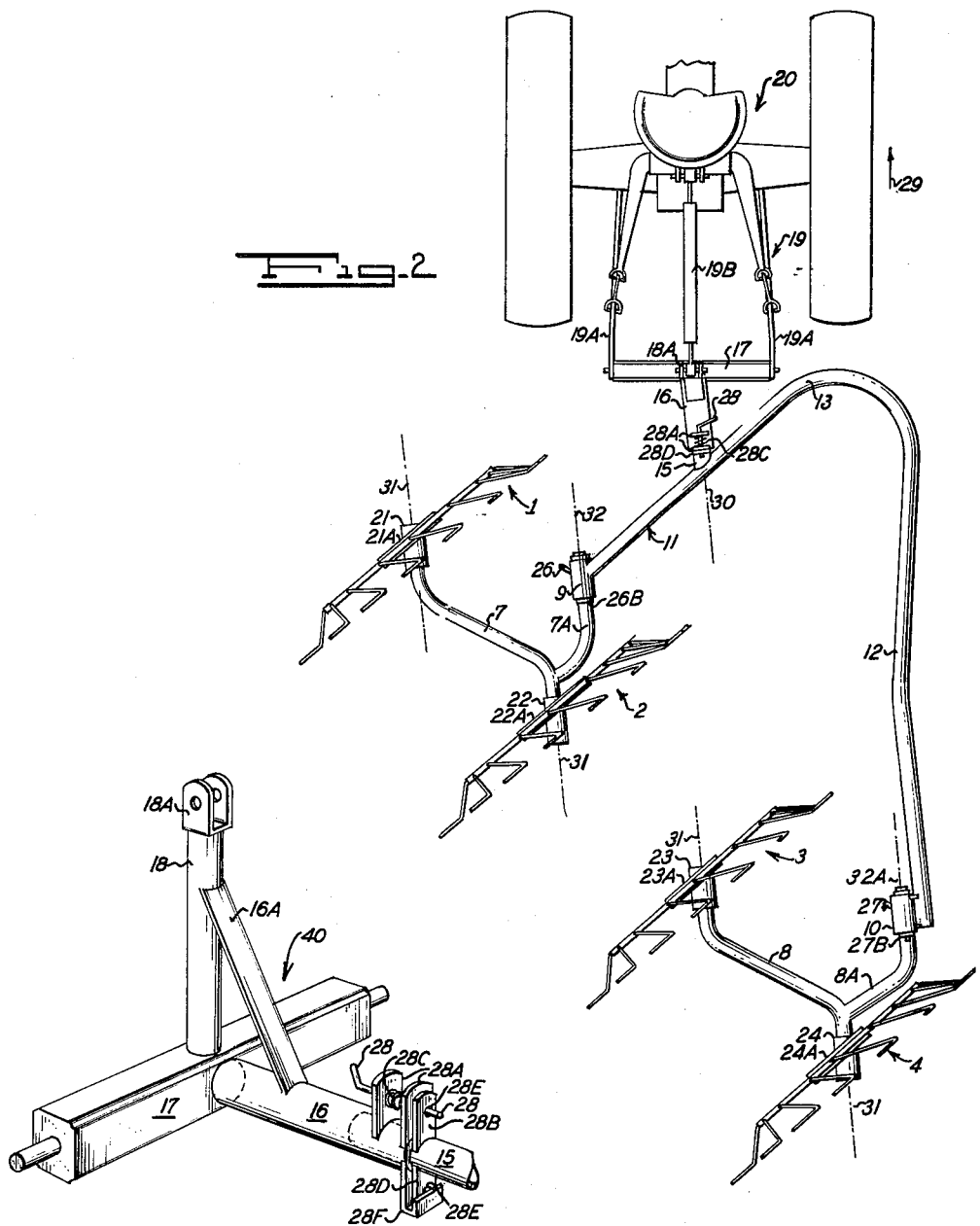

United States Patent Office 3,111,801
Patented Nov. 26, 1963

3,111,801
IMPLEMENTS FOR LATERALLY DISPLACING CROP LYING ON THE GROUND
Cornelis van der Lely, 7 Bruschrain, Zug, Switzerland
Filed Aug. 29, 1961, Ser. No. 134,736
10 Claims. (Cl. 56—366)

This invention relates to a rake and more particularly relates to an implement for laterally displacing hay or other crop lying on the ground having a frame with at least two groups of rake wheels mounted thereon in an arrangement whereby the rake can conveniently be converted to a side delivery rake, swath turner, or a tedder. The arrangement of this invention permits the implement to be brought from one position to another by the inversion of the frame or frame part which carries the rake wheels or on the individual sleeves which carry the rake wheels or any combination of these.

In accordance with the invention, there is provided an implement of the foregoing type wherein the rake wheels of a group are mounted upon a supporting member which extends from the rear side of a leading rake wheel of the group concerned to the front side of the rake wheel next in the group.

It is to be understood that throughout this specification, such terms as "front," "rear," "leading," and "oncoming," are used with reference to the normal direction of travel of the implement.

This application is a continuation-in-part of my previous application Serial No. 15,668, now Patent 3,080,699, filed March 17, 1960.

For better understanding of the invention and to show how the same may be carried into effect, reference is now made by way of example to the accompanying drawings in which:

FIGURE 1 is a plan view of the implement of the invention in a side delivery rake position;

FIGURE 2 is a plan view of the implement of the invention in a tedder position;

FIGURE 3 is a further plan view of the implement of the invention in a swath turner position;

FIGURE 4 is a perspective view of the coupling means for the implement of the invention; and FIGURE 5 is a perspective view of one of the rake wheels showing its sleeve and bearing structure.

In FIGURE 1, the implement of the inventor is shown connected to a tractor 20 which has a 3-point power hoist 19 possessing the usual pair of lower links 19A and upper link 19B. A coupler 40 which is a coupling means provided for attachment to the ends of the aforesaid links of the power hoist which comprises a horizontal bar 17 which is adapted to be connected between the lower links 19A and a vertical post 18, the upper end 18A of which connects to the upper link 19B, while the lower end is secured centrally on bar 17. A short tubular frame member 16 is secured at one end to bar 17 with a brace 16A rigidly connecting member 16 with post 18 (see FIGURE 4). The rearward end of frame member 16 has a pair of vertically disposed lugs 28A, the locking pin 28 being spring loaded by a spring 28C whereby the spring tends to force the pin 28 to the rear beyond the end of the frame member 16.

A stub shaft 15 is received in the hollow of the tubular frame member 16 and carries two diametrically opposed lugs 28B and 28D. Only lug 28B can be seen in FIGURE 1 but the other lug 28D, which is annularly displaced 180° therefrom, can be seen in FIGURES 2 and 3 and the relationship of these lugs can be seen best in FIGURE 4. It will be noted that they each have a hole 28E into which the protruding end of the locking pin 28 may be introduced according to wether the lug 28B or the lug 28D is in register with the pin 28. A securing lug 28F is disposed downwardly from tubular frame member 16 at its rear end. The terminal part of lug member 28F is formed in a U-shape to grasp lug member 28D, as shown in FIGURE 4. It will thus be appreciated that when the tractor 20 is traveling forward, the connection between the stub shaft 15 and coupler 40 comprises the aforementioned association between lug member 28F and rear lug 28B or 28D, as the case may be, together with pin 28 and the receipt of the stub shaft 15 in the hollow tubular member 16.

The stub shaft 15 is rigidly mounted upon a main frame beam 11. The latter consists of portions 12 and 13 with the portion 12 extending generally in the intended direction of travel of the implement which is indicated by arrow 29. The portion 13 is, on the other hand, transverse to the intended direction of travel so that these two portions are inclined to one another at an angle indicated at 14, which is approximately 50°.

The free end of frame beam portion 13 comprises a bearing sleeve 9, the axis of which is indicated at 32. A spring loaded locking pin 26 is mounted upon the sleeve 9 in the same manner as the locking pin 28 is mounted upon the frame member 16. Bearing sleeve 9 receives rotatably one end of a curved arm 7A which has a pair of diametrically opposed lugs 26A and 26B. Each lug 26A and 26B is formed with an opening in which pin 26 can be entered, depending upon which lug is brought into register therewith. Only lug 26A is seen in FIGURES 1 and 3 but the lug 26B can be seen in FIGURE 2. The free end of the other frame beam portion 12 similarly comprises a bearing sleeve 10 having an axis 32A which is provided with a spring loaded locking pin 27 arranged in the same manner as locking pins 26 and 28. One end of a curved arm 8A is rotatably received in the bearing sleeve 10. Arm 8A also has a pair of diametrically opposed lugs 27A and 27B. Lug 27B can be seen in FIGURE 2. The arms 7A and 8A are held in the respective bearing sleeves 9 and 10 by retaining rings clearly shown in FIGURE 1.

The free end of arm 7A is fixed approximate to one end of a supporting member 7 which serves to support a group of rake wheels 1 and 2. The support 7 is curved at each end in opposite directions to form at its ends a pair of stub shafts with sleeves 21 and 22 mounted thereon. These stubs shafts of support 7, together with their sleeves 21 and 22 have parallel axes indicated at 31, 32. Sleeves 21 and 22 are adjustable upon their stub shafts about axes 31, 32 and there is provided locking means comprising a bolt 25 (FIG. 5) which bears a ground support 7 to hold each of the sleeves in the desired positions of adjustment. Each sleeve, 21 and 22, has a bearing, 21A and 22A, mounted thereon to permit the free rotation of the rake wheels 1 or 2 as the case may be (see FIGURE 5). The axis indicated at 39 of each bearing, 21A or 22A, is inclined to the axes 31 so that by turning the sleeve upon which a bearing is mounted, the obliquity of the associated rake wheel in relation to the direction of travel of the implement can be altered. If turned 180°, the obliquity is reversed.

Arm 8A is secured to a supporting member 8 which is the same as member 7 and which also carries sleeves 23 and 24 which are rotatable about axes 31 and are lockable with the aid of locking means 25. The sleeves 23 and 24 have inclined bearings 23A and 24A mounted on them. These bearings 23A and 24A carry freely rotatable rake wheels 3 and 4 which form the second group of rake wheels similar to the first group 1 and 2.

When the implement is in the position shown in FIGURE 1, the power hoist of the tractor can be adjusted so as to allow rake wheels 1 to 4 to come into contact with the ground. As the tractor is driven in direction 29, contact of the rake wheels with the ground and crop lying thereon causes rake wheels 1 to 4 to rotate because of their oblique setting in relation to the line of travel. Since rake wheels 1 to 4 constitute a single row of rake wheels, it will be understood that crop in the path of the leading rake wheel 1 will be displaced laterally into the path of the next oncoming rake wheel 2 and so on until the crop is finally displaced to the left of rake wheel 4. Hence in the position shown in FIGURE 1, the implement acts as a side delivery rake delivering to the left.

The implement may be brought from the position shown in FIGURE 1 to the position shown in FIGURE 2 by first raising the implement from the ground by means of the tractor power hoist. When in the raised position the locking pin 28 is withdrawn against the action of a spring 28C so that pin 28 is withdrawn against the action of a spring 28C so that pin 28 no longer engages lug 28B. Frame beam 11 is now inverted by turning it through 180° about the axis of the frame member 16, as indicated at 30. This brings frame beam 11 into position as shown in FIGURE 2 and the locking pin 28 is engaged in lug 28D to hold the frame beam in the new position. Next the locking devices associated with the sleeves of the rake wheel bearings 21A, 22A, 23A and 24A are released so that rake wheels 1 to 4 are turned to a position of opposite obliquity by turning the sleeves 180°. When this is accomplished, rake wheels 1 to 4 are in the position shown in FIGURE 2 and the implement is returned to its lowered position. When the implement as shown in FIGURE 2 travels over the ground in the direction indicated by arrow 29 with the rake wheels in contact with the ground, the leading rake wheel 1 displaces crop to the left out of the path of the oncoming rake wheel 2. Similarly, the rake wheel 2 displaces crop to the left out of the way of the rake wheel 3. And in the same manner, rake wheels 3 and 4 independently displace a strip of crop. Hence all the rake wheels operate independently of one another and the implement acts as a tedder. It is clear that the rake wheels can be brought to a position of opposite obliquity by readjusting the sleeves 21A, 22A, 23A, 24A 180°. In such position the implement will act again as a side delivery rake, but delivering to the right. However, unless the rake wheels 1 to 4 are adaptable to be rotated by the ground in counter-clockwise as seen from the rear, their obliquity with respect to the direction of travel 29 should not be disturbed.

From the position shown in FIGURE 1, the implement may alternatively be brought to the position shown in FIGURE 3, where it will act as a swath turner.

To achieve the position shown in FIGURE 3, the implement shown in FIGURE 1 is again raised by the power lift and adjusted so that the frame beam 11 is turned to the position previously described with reference to FIGURE 2. Thereafter, the locking pins 26 and 27 are withdrawn from cooperation with lugs 26A and 27A and the arms 27A and 28A together with members 7 and 8 are swung 180° about their respective axes 32 and 32A. The lock pins 26 and 27 are now entered in the lugs 26B and 27B, respectively, and the implement is lowered. When the implement is moved in the direction 29 with the rake wheels in contact with the ground in the position shown in FIGURE 3, the rake wheel 1 delivers crop to the left into the path of rake wheel 2. Rake wheel 2 engages this crop and delivers it also to the left so that rake wheels 1 and 2 cooperate to turn a swath. The group of rake wheels 3 and 4 are disposed behind group 1 and 2, but there is no cooperation between the groups. Rake wheel 3 delivers crops to the left into the path of rake wheel 4 which further delivers crop to the left. The group 3 and 4 thus operates upon another swath so that the two swaths are simultaneously turned. As appears from FIGURE 1, there is a substantial distance between bearing sleeves 9 and 10, measured in the direction of travel of the implement as indicated by 33. It has been found advantageous that distance 33 be relatively great. The reason for this is that when the implement is brought into the position of FIGURE 3, during swath turning a swath passes along the front of the group of rake wheels 3 and 4 and it is necessary that there be sufficient clearance between the two groups of rake wheels in order that the swath moved by group 3 and 4 does not come into contact with the group of rake wheels 1 and 2.

It will, of course, be understood that the position shown in FIGURE 3 may be attained from the position shown in FIGURE 2. Thus commencing with the position shown in FIGURE 2, the rake wheels first have their obliquity reversed by turning the sleeves 180° about axes 31. Thereafter, supporting members 7 and 8 are each swung 180° about their axes 32 and 32A so that the position in FIGURE 3 is reached.

The frame of the implement described above is generally located in a plane which is substantially at the same level as the rotational axes of the rake wheels. When the implement is in the working position shown in FIGURE 3, it will be noted that the frame beam portion 13 lies in front of the rake wheel 1 and is of length substantially equal to the overall diameter of rake wheel 1. The frame beam portion 12 in this example is about 1.7 times the overall diameter of a rake wheel. In all, the working positions of the implement, this portion 12 extends substantially parallel to the intended direction of travel of the implement. If a line 34 (see FIGURE 1) is drawn so as to interconnect the bearing sleeves 9 and 10, the portions 12 and 13 form together with such a line 34, a triangle, the longest side of which is constituted by the portion 12, and the line 34 being in this example about 1.5 times the diameter of a rake wheel. It will be noted that the axes 31, 32, and 32A are all parallel and extend substantially in the intended direction of travel of the implement 29. On the other hand, the axes of rotation of the rake wheels are inclined to the axes which have just been enumerated. In FIGURE 1, the axis of rotation of rake wheel 3 is shown, and it will be seen that this axis is inclined at an angle, indicated at 35, to axis 30. This angle 35 is about 35° as shown, but it will be appreciated that in other constructional modifications this angle may range between 20° and 70°.

From a comparison of the figures, it is to be noted, that when the rake wheels of a group are cooperating, as for example the group 1 and 2 in either FIGURE 1 or FIGURE 3, the supporting member 7 extends from behind the leading rake wheel of the group to the front of the next oncoming rake wheel of the group with the supporting member lying substantially parallel to the planes of the rake wheels 1 and 2. When rake wheels 1 and 2 are independently operated as in FIGURE 2, the supporting member 7 lies substantially perpendicular to the planes of rotation of the rake wheels 1 and 2, and the distance between the rake wheels of the group has been substantially increased. It is advantageous that the distance should be increased in this respect for the proper performing of the tedding action. Finally, it will be noted that the supporting structure for each group of rake wheels is constituted by a supporting member such as 7 combined with an arm such as 7A, the arm and the supporting member being shaped like the divergent limbs of a Y or V. This provision of the supporting Y or V for the supporting structure of each group substantially facilitates the conversion of the implement from one position to another.

It will also be appreciated that with reversible rake wheels, the implement can be converted to either a side delivery rake delivering to the right or alternatively to the left, or into a tedder tedding to the right or the left, or into a swath turner which turns to the right or the left. In other words, the particular structure of this rake permits its possible adaptation to six working positions.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

As used in the claims, the draft means refers to the coupler 40, including frame member 16 and stub shaft 15 and frame beam 11. The stub shaft 15 together with lugs 28B and 28D, and frame beam 11 represent the second part of the draft means, whereas the first part includes the remaining structure of the coupler 40. The beam horizontally journalled with respect to the second part of the draft means comprises the arm 7A and support 7 on one side of the frame beam 11 and, on the other side, the arm 8A and the support 8.

I claim:

1. A convertible side delivery raking device for laterally displacing material lying on the ground comprising draft means having two parts, one of said parts being selectively rotatable relative to the other part, the first part of said draft means having coupling means for connecting the device with a tractor lift mechanism, a beam horizontally journalled with respect to the second part of said draft means having a leading rake wheel and a trailing rake wheel thereon said beam mounting said leading rake wheel from the rake wheel's after side and mounting said trailing rake wheel from the rake wheel's forward side, each rake wheel being operatively connected to said beam by means of a bearing about which the rake wheel is rotatable, said bearing being arranged on a sleeve which is turnably and fixably mounted upon said beam, the axis of said sleeve and of said bearing being inclined relative to the axis of rotation of said rake wheel so that by turning the sleeve the plane of rotation of the said rake wheel can be adjusted in relation to said beam, whereby said beam may be rotated with respect to the first part of the draft means and said bearings may be rotated with respect to the frame beam to invert the device to form a tedder.

2. An implement as claimed in claim 1, wherein the second draft means includes the frame of the implement and each beam is secured to said frame in such a way that said beam together with its associated group of rake wheels can be adjusted with respect to the frame about an axis which extends substantially in the intended direction of travel of the implement.

3. An implement as claimed in claim 2, wherein said axis is inclined to the rotational axes of the rake wheels of the group.

4. An implement as claimed in claim 1, wherein the rake wheels of a group are adjustable in relation to the beam thereof to an extent such that the planes of rotation of the rake wheels may lie substantially perpendicular to the beam or may lie substantially parallel thereto.

5. An implement as claimed in claim 1, wherein said beam forms part of a supporting structure which is generally of Y- or V-shape, the free end of one limb of such structure serving to connect the structure with the second part of said draft means.

6. An implement as claimed in claim 1, wherein the axes about which said bearings are turnable, the axes about which said beams are adjustable in relation to said second part of said draft means, and the axis about which said second part of the draft means carrying said beams is turnable, are all substantially parallel to one another.

7. An implement as claimed in claim 1, wherein there are two groups of rake wheels and the second part of said draft means has two beams portions which are connected one to the other so that when viewed in plan they are mutually inclined at an angle of about 50°, the free end of each such portion being connected to the beams of one of the groups of rake wheels.

8. An implement as claimed in claim 1, wherein there are two groups of rake wheels, the beam of each group being fastened at, or near, either end of a frame beam, the latter comprising two portions one of which extends substantially in the intended direction of travel of the implement, and the other of which is substantially transverse thereto.

9. An implement as claimed in claim 1, wherein the locations where said beams are secured to the frame are spaced from one another by a distance which is at least equal to half the diameter of a rake wheel, such distance being measured substantially in the intended direction of travel of the implement.

10. An implement as claimed in claim 1, wherein said beams are connected to a frame beam which is so shaped that a line joining the places of connection of said beams to said frame beam encloses together with the frame beam a triangular area one side of which is approximately equal to the diameter of a rake wheel, a second side of which is about 1.5 times this diameter, and the third side of which is longer than the second side.

References Cited in the file of this patent

FOREIGN PATENTS

| | | |
|---|---|---|
| 314,222 | Switzerland | July 31, 1956 |
| 1,139,762 | France | Feb. 18, 1957 |
| 564,291 | Italy | June 13, 1957 |